US007057653B1

(12) United States Patent
Kubo

(10) Patent No.: US 7,057,653 B1
(45) Date of Patent: Jun. 6, 2006

(54) APPARATUS CAPABLE OF IMAGE CAPTURING

(75) Inventor: Hiroaki Kubo, Muko (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/100,799

(22) Filed: Jun. 19, 1998

(30) Foreign Application Priority Data

| Jun. 19, 1997 | (JP) | 9-162478 |
| Jun. 19, 1997 | (JP) | 9-162480 |
| Jun. 19, 1997 | (JP) | 9-162484 |
| Aug. 28, 1997 | (JP) | 9-232543 |
| Aug. 28, 1997 | (JP) | 9-232549 |

(51) Int. Cl.
H04N 3/14 (2006.01)
H04N 5/335 (2006.01)
H04N 9/083 (2006.01)
H04N 5/202 (2006.01)
H04N 9/69 (2006.01)
G06K 9/36 (2006.01)
G06K 9/32 (2006.01)

(52) U.S. Cl. ............... 348/273; 348/254; 348/229.1; 348/675; 382/236; 382/166; 382/300

(58) Field of Classification Search ............... 348/272, 348/649, 700, 222, 254, 255, 231, 232, 233, 348/229, 277, 333.11, 246, 711, 675, 679, 348/273; 375/240.16; 382/236, 238, 162, 382/166, 167, 300; 358/525, 518–523
See application file for complete search history.

(56) References Cited

U.S. PATENT DOCUMENTS

| 4,837,628 | A | | 6/1989 | Sasaki | 358/209 |
| 4,876,590 | A | * | 10/1989 | Parulski | 348/281 |
| 5,125,042 | A | * | 6/1992 | Kerr et al. | 382/300 |
| 5,351,087 | A | * | 9/1994 | Christopher et al. | 348/441 |
| 5,382,976 | A | | 1/1995 | Hibbard | 348/273 |
| 5,493,335 | A | * | 2/1996 | Parulski et al. | 348/231.6 |
| 5,506,619 | A | * | 4/1996 | Adam, Jr. et al. | 348/272 |
| 5,532,716 | A | * | 7/1996 | Sano | 345/698 |

(Continued)

FOREIGN PATENT DOCUMENTS

EP 0 632 663 A2 1/1995

(Continued)

OTHER PUBLICATIONS

U.S. Appl. No. 08/922,815.*

(Continued)

Primary Examiner—Ngoc-Yen Vu
Assistant Examiner—John M. Villecco
(74) Attorney, Agent, or Firm—Sidley Austin LLP

(57) ABSTRACT

Apparatus for image capturing has preview function for monitor-outputting an image before capturing image to be recorded, image processing section including band correcting section for controlling frequency characteristic of color data constituting image data, gamma correcting section for controlling gradation characteristic of image data, pixel interpolating section for interpolating pixels with unknown data of each color data constituting image data, and exposure control section for controlling exposure setting value. Capture image size, image data compression rate or subject image recording mode can be met before capturing an image. Controller is selected according to capture image size, image data compression rate or image recording mode set before capturing the image. When an image, captured with setting of small capture image size, is outputted in specified output size, an image provided with a more appropriate characteristic for appreciation can be obtained and reduction in image quality due to data compression can be suppressed.

34 Claims, 13 Drawing Sheets

U.S. PATENT DOCUMENTS

| | | | | |
|---|---|---|---|---|
| 5,534,916 | A | 7/1996 | Sakaguchi | 348/222 |
| 5,534,919 | A * | 7/1996 | Nobuoka | 348/246 |
| 5,585,927 | A * | 12/1996 | Fukui et al. | 358/518 |
| 5,596,367 | A * | 1/1997 | Hamilton, Jr. et al. | 348/272 |
| 5,734,427 | A | 3/1998 | Hayashi | 348/333 |
| 5,774,601 | A * | 6/1998 | Mahmoodi | 382/298 |
| 5,793,379 | A * | 8/1998 | Lapidous | 382/298 |
| 5,963,192 | A * | 10/1999 | Wong et al. | 345/150 |
| 5,990,949 | A * | 11/1999 | Haruki | 348/254 |
| 6,025,929 | A * | 2/2000 | Nakajima et al. | 358/518 |
| 6,064,396 | A * | 5/2000 | Ouchi et al. | 345/604 |
| 6,226,414 | B1 * | 5/2001 | Go | 382/240 |
| 6,269,181 | B1 * | 7/2001 | Acharya | 382/162 |
| 6,366,692 | B1 * | 4/2002 | Acharya | 382/162 |
| 6,466,263 | B1 * | 10/2002 | Suzuki | 348/220.1 |
| 6,567,119 | B1 * | 5/2003 | Parulski et al. | 348/207.2 |
| 6,650,366 | B1 * | 11/2003 | Parulski et al. | 348/231.6 |
| 6,977,683 | B1 * | 12/2005 | Okada | 348/273 |
| 2002/0054110 | A1 * | 5/2002 | Ejima et al. | 345/764 |

FOREIGN PATENT DOCUMENTS

| | | | |
|---|---|---|---|
| EP | 0 632 663 | A3 | 1/1995 |
| JP | 63-050279 | (A) | 3/1988 |
| JP | 63-268376 | (A) | 7/1988 |
| JP | 63-272179 | (A) | 11/1988 |
| JP | 1-270462 | (A) | 10/1989 |
| JP | 4-070273 | | 3/1992 |
| JP | 04-317268 | (A) | 9/1992 |
| JP | 6-189256 | (A) | 7/1994 |
| JP | 7-59098 | (A) | 3/1995 |
| JP | 7-284011 | (A) | 10/1995 |
| JP | 7-312714 | (A) | 11/1995 |
| JP | 11018047 | A * | 1/1999 |
| JP | 11220751 | A * | 8/1999 |
| JP | 2001061092 | A * | 3/2001 |
| WO | WO200010325 | A * | 2/2000 |

OTHER PUBLICATIONS

Japanese "Preliminary Notice of Rejection", dated Jul. 25, 2000, for counterpart Japanese Patent Application No. 09-162478, with an English-translation thereof.

* cited by examiner

APPARATUS CAPABLE OF IMAGE CAPTURING

This application is based on applications Nos. H09-162478, H09-162480, H09-162484, H09-232543, H09-232549 filed in Japan, the contents of which are hereby incorporated by reference.

BACKGROUND OF THE INVENTION

The present invention relates to an apparatus capable of image capturing for recording a captured image as digital data, that is, to an electronic still camera.

In recent years, an electronic still camera (so-called the digital camera) for recording an image as digital data into a memory has become popular. Image data recorded in an electronic still camera are outputted to, for example, a built-in monitor of a camera, an external CRT, a printer or the like and subjected to appreciation.

The electronic still camera is provided with a view finder, a monitor, etc., as a means by which the user confirms the field of view of the image pickup lens in capturing an image. Particularly, as an electronic still camera having a built-in monitor, there has been known one provided with a preview function for outputting an optical signal coming from the image pickup lens before capturing the image to be recorded. According to this type of camera, the user is able to confirm the balance and construction of the image to be captured, or to focus the image while monitoring a preview image outputted to the monitor. However, though there is a margin in the field of view, a LCD type is often used as the monitor, and the resolution and the contrast of the image projected on it are low. Accordingly, there has conventionally been the problem that the confirmation of the image cannot be sufficiently achieved due to the influence of a screen flare when the electronic still camera employing the built-in LCD monitor is used, particularly in a bright outdoor environment.

Furthermore, in the case of the electronic still camera, the size of the CCD constituting an image plane on which the image coming from the image pickup lens is formed is normally small, and therefore, the aperture of an optical stop placed between the image pickup lens and the CCD is relatively narrow. This has resulted in a deep depth of field, and particularly in the bright outdoor environment, it has been difficult to confirm the focus by means of the built-in monitor.

As one that improves the resolution and the contrast of the image on the monitor, there has been known a device that changes the brightness of the back light according to, for example, the peripheral illuminance. However, according to this method, there is little effect on improving the focusing.

For the purposes of confirming the image to be captured, focusing the image and producing other effects, the preview image is required to be more rapidly processed and outputted to the built-in monitor.

In an electronic still camera, the capacity of the recording medium provided in the camera is normally constant, and therefore, the number of frames capable of capturing images is limited. Concerning this, there has been known an electronic still camera with which the user sets a capture image size representing an image resolution before capturing an image. According to this type of camera, setting a desired capture image size according to the situation can control the amount of data of each image. For example, when it is desired to save the number of image frames to be captured, it is possible to set the capture image size to a small size for the reduction in amount of image data, thereby allowing the securement of the number of image frames to be captured.

However, an image captured with the setting of a small capture image size has the quality of an image obtained by thinning out an image captured with the setting of a large capture image size since the image data of the small capture image size are outputted while being enlarged and interpolated when outputted in a specified output size to the built-in monitor, printer or the like.

That is, the quality of the image outputted in the specified output size mainly depends on the set capture image size. Therefore, an image captured with the setting of a small capture image size is outputted, the resulting image sometimes becomes aesthetically degraded in terms of image quality for appreciation use.

As a method for reducing the amount of data of each image in the electronic still camera, there is one method of setting the aforementioned capture image size to be small, and, conventionally, a method of reducing the amount of data by compressing the captured image data has often been used together with the above method. Among such electronic still cameras capable of executing data compression, there is one in which the user sets the compression rate of image data before capturing an image.

According to this type of camera, the user can set the desired data compression rate to control the amount of data of each image depending on the situation. When it is desired to store a larger number of frames into a recording medium having a certain capacity, or when it is desired to increase the data transfer speed in data processing, the user can set the compression rate high to execute compression so that the amount of image data is reduced.

In such an electronic still camera, the compression is executed so that the image data becomes smaller with the setting of a higher compression rate, and on the other hand, the image quality becomes more degraded. The conventional electronic still camera has generally been provided with a band correcting section for controlling the frequency characteristic of a signal for suppressing, for example, noises and a characteristic control section such as a gamma correcting section for controlling a gradation characteristic for the adjustment of the image contrast, with those control sections controlling the signal characteristics influencing the image quality.

However, in the conventional electronic still camera, such a characteristic control has not been executed according to the setting of the compression rate. When an image is captured at a high compression rate, the degradation in image quality based on a change in contents of the image quality due to data compression, cannot be avoided even in high-resolution image capturing for obtaining a fine image, and therefore, it has often been the case where the intended image forming cannot be achieved.

As an imaging device for an electronic still camera, normally a CCD having a specified number of pixels is used. In such an electronic still camera, as the number of CCD pixels increases, the resolution increases and an image having a better image quality can be obtained. However, the capacity of the storage medium provided in the camera is constant. Therefore, particularly in the electronic still camera, which has many CCD pixels and handles a high-resolution image, the amount of data of each image becomes large and the number of image frames to be captured decreases.

This problem is improved by setting the image conditions such as the capture image size, the image data compression rate and so on before capturing an image and reducing the amount of data of each image. In this case, the image quality becomes degraded due to the setting of a small capture image size or the setting of a high compression rate for image data as stated before.

When the image data compression rate is set high in a high-resolution electronic still camera having many CCD pixels, a significant influence is exerted on the image quality and much time is required for the compressing process, for which the image processing to be executed in the electronic still camera sometimes becomes retarded as a whole. Therefore, in this type of electronic still camera, there has been the problem that the image processing speed is reduced relative to the degradation in image quality and the number of image frames that can be captured per time is small.

Furthermore, in the electronic still camera that uses a CCD as an imaging device, the subject of the objective image to be captured is first recognized as an optical signal in the CCD, thereafter subjected to processing in various signal control sections and finally stored as digital data in a memory.

In capturing an image, mainly intended for photographic appreciation, a human being or a natural object is often selected as a subject, and therefore, a setting for processing an image signal obtained from the CCD as a halftone image having a gradation property has preparatorily been performed in each signal control section in the prior art electronic still camera. However, particularly when an electronic still camera having a CCD of a single plate (i.e., one CCD plate) is used for capturing the image of a text comprised of, for example, letters and numbers, the ruggedness of the edge portions of the letters is exaggerated by the influence of the process for emphasizing the image outline, and thin letters possibly become very obscure.

A device capable of changing the mode of recording an object according to the type of the object has been known. This device has, for example, a mode of recording an object as a natural color or monochrome halftone image provided with a gradation property and a mode of recording the object as a binary image having no gradation property as the modes of recording the object, and processing the image signal based on a recording mode selected according to the type of the object. According to this, the text as stated before is processed as a binary image, and therefore, a text image whose edge portions are comprised of relatively smooth letters and numbers can be obtained.

However, in the prior art apparatus, though the obscurity of letters of the text as stated before is improved, there is observed a tendency that the thin lines of the letters become dotted in processing the text as a binary image, and this has often caused a recognition failure. Therefore, even if the electronic still camera capable of changing the recording mode according to the type of the object is considered, when a text to be subjected to image capturing contains thin lines in the letters of the text, it has been difficult to faithfully reproduce the thin lines of the letters included in the text.

SUMMARY OF THE INVENTION

An object of the present invention is to provide an electronic still camera capable of enhancing the ease of viewing a preview image outputted to a monitor and of more rapidly processing preview image data for outputting of the data to the monitor.

Another object of the present invention is to provide an electronic still camera capable of obtaining an image provided with more desirable characteristics for appreciation particularly when an image captured with the setting of a small capture image size is outputted in a specified output size intended for photographic appreciation.

Still another object of the present invention is to enable capturing of an increased number of image frames unit of by executing image processing at a speed corresponding to the image quality, particularly when the compression rate is set high in an electronic still camera capable of setting the capture image size and the image data compression rate.

In one aspect of the present invention, an apparatus capable of image capturing comprises: an imaging device which captures image data; a recorder for recording image data from the imaging device into a specified medium; a display unit for displaying image data transferred from the imaging device; an exposure controller for controlling exposure in capturing an image by means of the imaging device; and a changer for changing exposure control by the exposure controller between recording by the recorder and displaying by the display unit.

In a second aspect of the present invention, an apparatus capable of image capturing comprises: an imaging device which captures image data; a recorder for recording image data transferred from the imaging device into a specified medium; a display unit for displaying image data transferred from the imaging device, an interpolating portion for interpolating pixels constituting an image; and a changer for changing an interpolating process by the interpolating portion between recording by the recorder and displaying by the display unit.

In a third aspect of the invention, an electronic still camera comprises: an imaging device which captures image data; an image recording mode setting portion capable of setting an image recording mode; a band correcting portion for correcting the frequency characteristic of image data transferred from the imaging device; a gamma correcting portion for correcting the gradation characteristic of the image data transferred from the imaging device; and a controller for controlling the band correcting portion and the gamma correcting portion according to the set image recording mode.

In a fourth aspect of the invention, an electronic still camera comprises: an imaging device having a filter array of a plurality of colors; a compression rate setting portion for setting a compression rate of image data; an interpolating portion for executing pixel interpolation based on the data of colors constituting the image data; and a controller for controlling the interpolating portion according to a compression rate set by the compression rate setting portion.

In a fifth aspect of the present invention, an image data processing method for an apparatus capable of image capturing comprises the steps of setting a compression rate of image data obtained from an imaging device; and executing an interpolating process according to the set compression rate based on the image data of colors constituting the image data.

In a sixth aspect of the present invention, an apparatus capable of image capturing which can display and record a captured image comprises the steps of: capturing image data by means of an imaging device; and executing a varied interpolating process depending on whether the captured image is to be displaced or recorded.

DETAILED DESCRIPTION OF THE PREFERRED EMBODIMENTS

Preferred embodiments of the present invention will be described in detail below with reference to the accompanying drawings.

Figure 1:
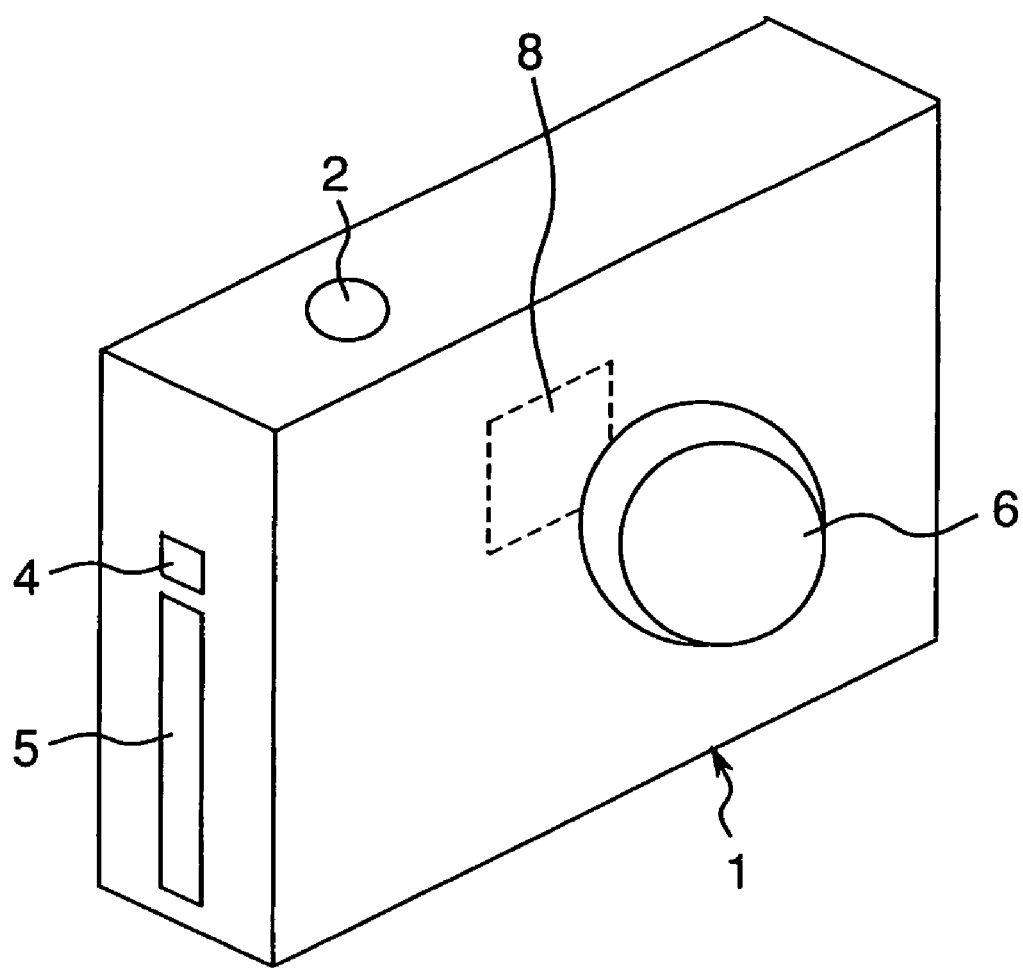
FIG. 1 is a perspective view of an electronic still camera according to an embodiment of the present invention.

As shown in FIG. 1, an electronic still camera 1 of the present embodiment has a shutter button 2, an image pickup lens 6 and a built-in CCD 8. This electronic still camera 1 is provided with a card slot 5 which receives and connects a memory card (not shown, refer to FIG. 2 described later) for storing therein image data obtained by subjecting an electric signal transformed by the CCD 8 to a specified process, and the memory card connected to the card slot 5 is taken out of the card slot 5 by pressing a card ejecting button 4.

In the aforementioned electronic still camera 1, an image is formed on the CCD 8 by the image pickup lens 6 when the shutter button 2 is depressed, so that an optical signal is transformed into an electric signal by the CCD 8. This electric signal is converted into digital data as image data and subjected to processing.

Figure 2:
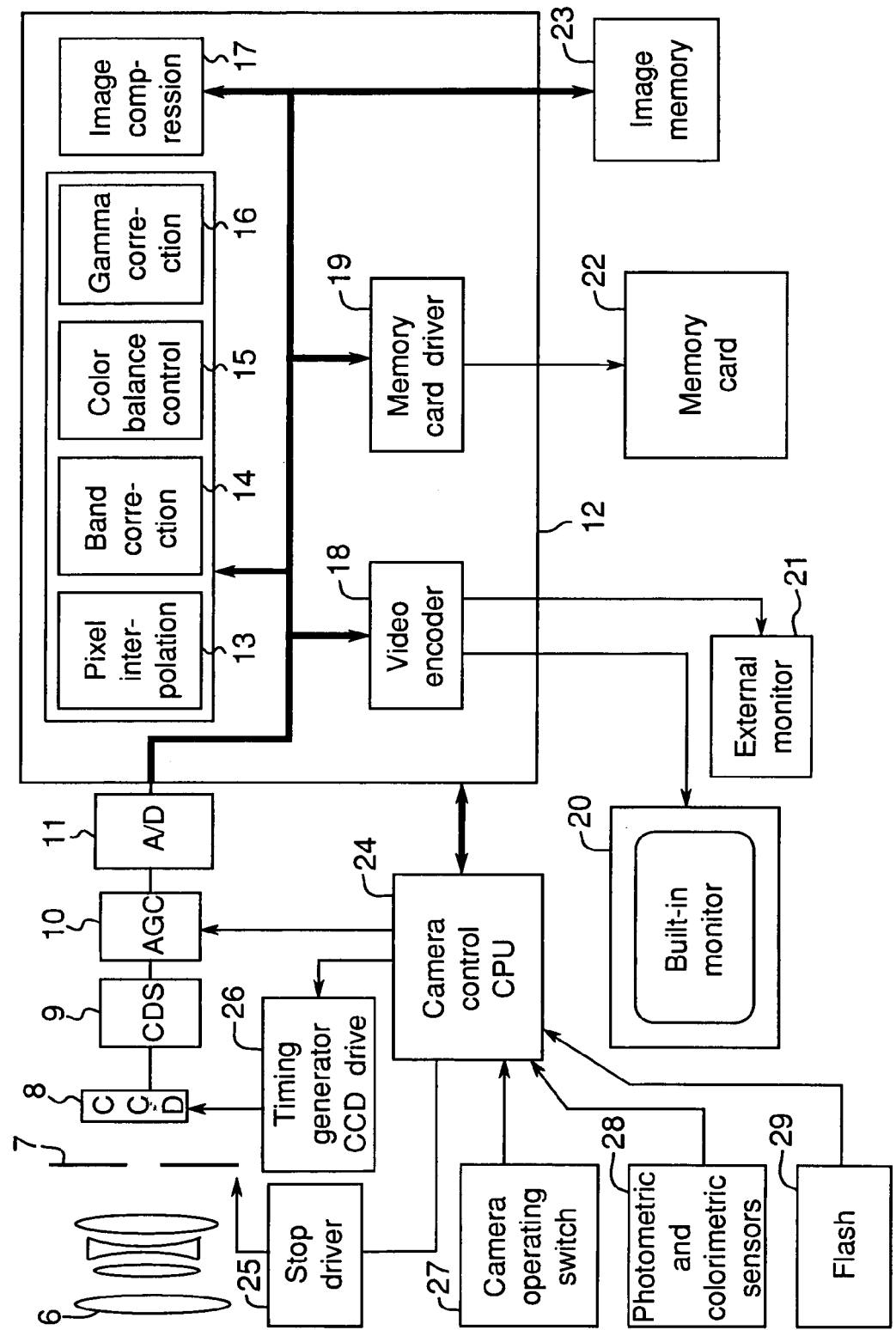
FIG. 2 is a block diagram showing the construction of the above electronic still camera.

FIG. 2 is a block diagram of the electronic still camera 1. As shown in FIG. 2, the electronic still camera 1 has the image pickup lens 6, an optical stop 7 for controlling the quantity of light coming from the image pickup lens 6, the CCD 8 for photoelectric transforming use, a camera control CPU 24 for controlling an image capturing operation of the optical system, a CDS 9 for sampling the electric signal obtained by the CCD 8 for the removal of noises, an AGC (Auto Gain Control) 10 for correcting the sensitivity with an automatically controlled gain, an A/D converter section 11 for executing analog-to-digital conversion (referred to as an A/D conversion hereinafter) and an image processing CPU 12 for executing specified processes on the digital signal obtained through the above sections.

This image processing CPU 12 is comprised of a pixel interpolating section 13 for executing an interpolating process on the image data of each color obtained by separating the colors of image data, a band correcting section 14 for controlling each frequency band of the image data of each color, a color balance control section 15 for individually correcting each color, a gamma correction section 16 for executing a gradation conversion of an input signal, an image compressing section 17 for compressing image data, a video encoder 18 for encoding image data and outputting the resulting data to a built-in monitor 20 or an external monitor 21 and a memory card driver 19 for supplying image data to the memory card 22.

The input side of the camera control CPU 24 for controlling the image capturing operation of the optical system is connected to a camera operating switch 27 including the shutter button 2 (see FIG. 1) and an image condition setting switch capable of setting a capture image size, a compression rate and so on before capturing an image; photometric and calorimetric sensors 28 for measuring the quantity of light and color when capturing an image; and a flash 29. The output side is connected to a stop driver 25 for driving the optical stop 7 and a timing generator CCD drive 26 for controlling an exposure time of the CCD 8 and the AGC 10. This camera control CPU 24 calculates exposure control data based on the quantity of light and color measured by the photometric and calorimetric sensors 28, and controls the stop value of the optical stop 7, the storing time (i.e., an electronic shutter speed) of the CCD 8, and the gain of the AGC 10, based on the exposure control data.

The camera control CPU 24 is connected via a data bus to the image processing CPU 12.

In the electronic still camera 1 having the above construction, the following image conditions are set by the user before capturing an image.

That is, the present electronic still camera 1 sets a capture image size for determining the resolution of an image and a data compression rate in the image compressing process as the image conditions.

There are provided three types of "512×384", "640×480" and "1024×768" as the capture image size, and the image size that the user desires can be selected according to the conditions. On the other hand, there are provided the three, types of "no compression mode", "1/8 JPEG compression mode" and "1/20 JPEG compression mode" as the image compression mode for determining the compression rate of the image data, and the user can select the desired one before capturing an image similar to the image size.

In the electronic still camera 1 of the present embodiment, there are provided the three types of "natural picture mode" intended for capturing the image of a human being, a landscape and so on of natural color, "gray text mode" for capturing the image of a natural object or a combination of it with letters and numbers in a monochrome style, and "binary text mode" intended for letters and numbers as an image recording mode representing the type of the subject, and the user can select the desired one of the modes according to the type of the subject before capturing an image.

There is further provided a CRT turning-on and -off mode for determining by setting whether to output an image signal to the built-in monitor side or to the external monitor side.

Figure 3:
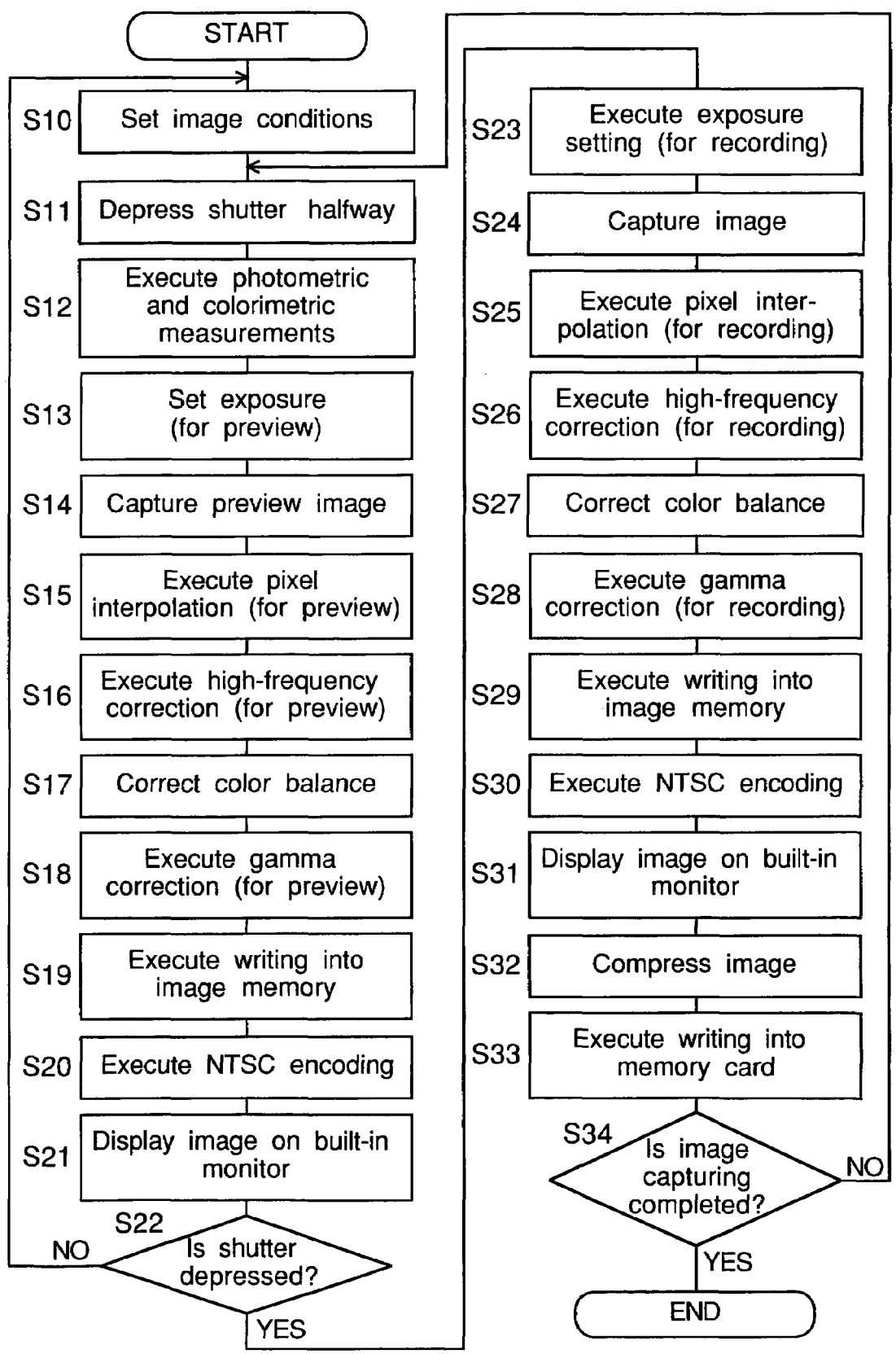
FIG. 3 is a flowchart of an image capturing operation of the above electronic still camera.

The fundamental picture taking operation of the electronic still camera 1 will be described with reference to the flowchart of FIG. 3.

In the electronic still camera 1 of the present embodiment, various conditions of the capture image size, the compression rate in the compression process and so on are set by the user before capturing an image, and the camera 1 takes in these set conditions (step S10).

When capturing an image, the image processing in the electronic still camera 1 is fundamentally comprised of the two steps of image processing when the shutter button 2 is depressed halfway (steps S11 through S21) and image processing when the shutter button 2 is depressed completely (steps S22 through S33). In the present embodiment, the electronic still camera 1 is provided with a preview function for displaying an image entering from the image pickup lens on the built-in monitor 20 when the shutter button 2 is depressed halfway, and the user can confirm the state of the image to be captured (the balance and construction of the picture) by the display image. When the shutter button 2 is further depressed to be put into the completely depressed state, an image entering from the image pickup lens 6 at the time is processed and thereafter recorded into the memory card 22.

The operation (in steps S11 through S21) when the shutter button 2 is depressed halfway will be described first. In this operation, the image to be captured is treated as a preview image and is subjected to specified image processing.

When the shutter button 2 is depressed halfway in step S11, the camera 1 first measures the quantity of light and color by the photometric and calorimetric sensors 28 (step S12). Subsequently, based on this measurement data, the exposure setting of the stop value of the optical stop 7, the storing time (i.e., the shutter speed) of the CCD 8, and so on, are executed (step S13).

After executing the exposure setting, light enters from the image pickup lens 6 and is transformed into an electric signal by the CCD 8. The camera 1 converts the electric signal from an analog form to a digital form and transmits the resulting signal as digital data to the image processing CPU 12 (step S14).

Subsequently, in the image processing CPU 12, pixels with unknown data of each color are interpolated by the pixel interpolating section 13 (step S15). This pixel interpolating section 13 is provided with a plurality of interpolating means, and the optimum interpolating means is selected among them according to the setting values of the capture image size and the compression rate taken-in in step S110.

Image data obtained after the pixel interpolation is subjected to outline correction in the band correcting section 14 (step S116), to color correction of the data of each color by the color balance control section 15 in step S17 and thereafter to gradation conversion in the gamma correction block 16 (step S118). Subsequently, the image data are temporarily written into an image memory 23 by the image processing CPU 12 (step S19).

Subsequently, the image data are read from the image memory 23, encoded into an NTSC/PAL form by the video encoder 18 (step S20) and outputted as a preview image to the built-in monitor 20 (step S21). When the shutter button 2 is kept in the half-depressed state, the image entering from the image pickup lens 6 is updated in a specified frame cycle and displayed as moving images on the built-in monitor 20. After confirming this preview image, the user can decide whether to capture the image or not. When the answer is YES (positive), the user completely depresses the shutter button 2.

When the shutter button 2 is completely depressed, the image processing is executed in steps S22 through S31. The flow of the processing is similar to that of the aforementioned half-depressed state of the shutter button 2, and therefore, no description is provided for it here. It is to be noted that the image data to be recorded into the memory card 22 are processed in this process.

The image data formed through the image processing in steps S22 through S31 are compressed in step S32. In this step, the image data are compressed based on the image data compression rate taken-in in step S10. This image compression needs more time, as the compression rate is higher. The image data obtained after the compression are recorded as a recording image into the memory card 22 in step S33. In step S34, the user decides whether or not to complete the image capturing. When the answer is YES, the image capturing operation is ended. When the answer is NO, the step S11 and the subsequent steps will be repeated.

According to the above flow, the image desired to be captured are processed and finally recorded as digital data.

Exposure Control Process

Next, an exposure control process in the electronic still camera 1 will be described. In the present embodiment, the stop driver 25, the timing generator CCD drive 26 and the AGC 10 are controlled on the basis of the exposure control data calculated by the camera control CPU 24 using the quantity of light and color measured by the photometric and calorimetric sensors 28. In the sections, the stop value of the optical stop 7, the storing time (so-called the electronic shutter speed) of the CCD 8 and the gain of the AGC 10 are set.

Figure 4:
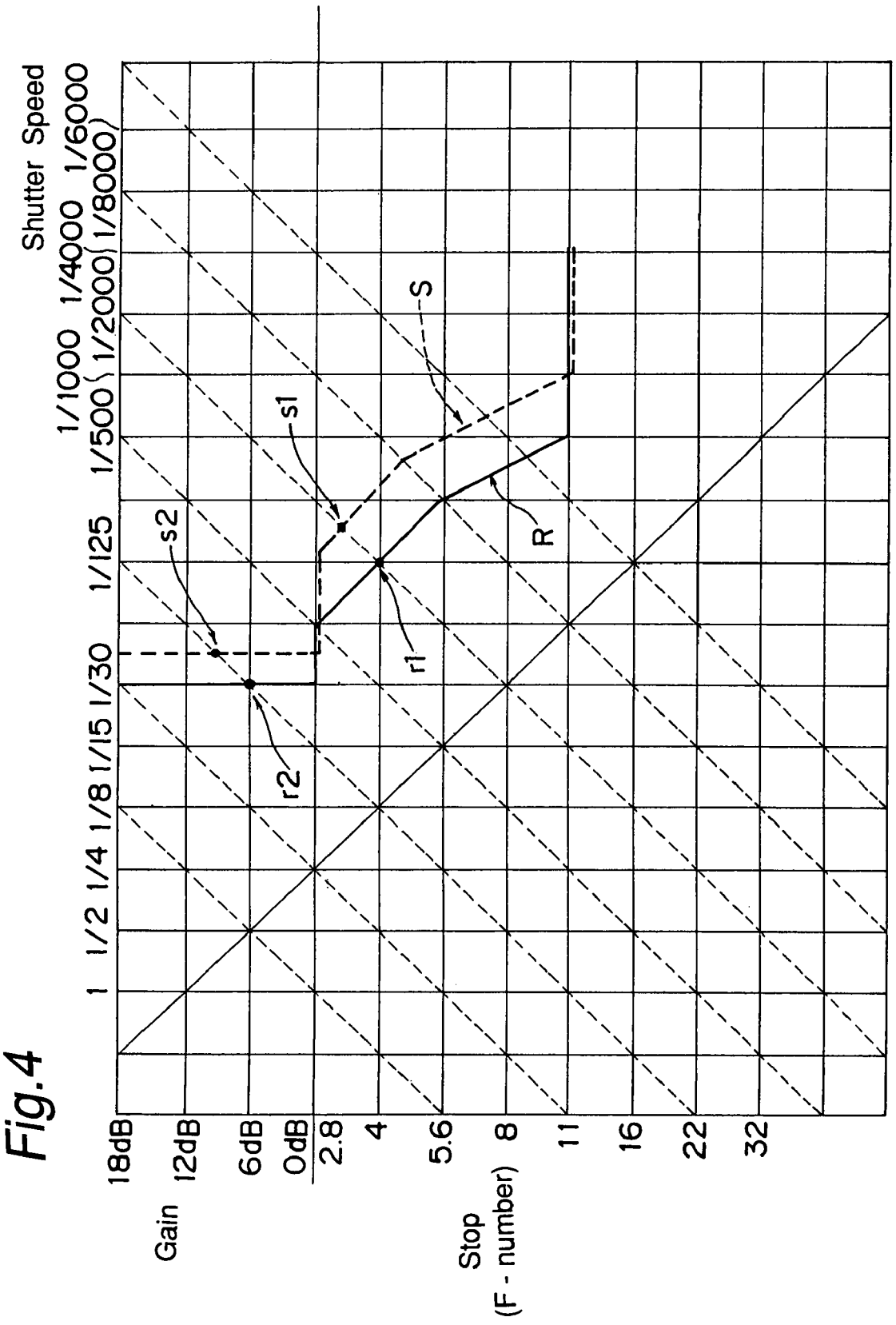
FIG. 4 is a graph showing the shutter speed relative to F-number.

FIG. 4 shows an automatic exposure control characteristic programmed for the camera control CPU 24. The solid line R and the dashed line S in the figure represent characteristic lines indicating exposure control characteristics for use in capturing the recording image and the preview image, respectively. This exposure control characteristic depends on the stop value of the optical stop 7, the storing time of the CCD 8 and the gain of the AGC 10. The right-side-up slanted lines in the figure represent the respective relations between the shutter speed and the stop value in an environment of a specified brightness for obtaining images of an identical brightness, where the slanted lines located closer to the right-hand side represent a brighter environment.

According to the exposure control characteristic lines R and S, a stop value F-number is set smaller in capturing the preview image than in capturing the recording image within a stop interlock range (F-number: 2.8 to 11) with respect to an environment of a specified brightness. For example, with regard to the image capturing executed with the exposure setting of a stop value F-number of 4 and a shutter speed of $\frac{1}{125}$ second (point r1 in the figure) in capturing the recording image, the stop value F-number is set to 3 and the shutter speed is set to $\frac{1}{180}$ second in capturing the preview image (point s1). According to this exposure characteristic, the stop value F-number is made small, that is, the aperture of the optical stop 7 is made large, the shutter speed is set faster so that the quantity of exposure does not change between preview image capturing and the recording image capturing.

By thus reducing the F-number and increasing the aperture of the optical stop 7, the depth of field in the case becomes shallow. As a result, the range in which the focusing is achieved becomes narrow, so that the confirmation of the focus by the preview image outputted to the built-in monitor 20 can easily be executed.

When the optical stop 7 is opened to the maximum (F-number: 2.8), the shutter speed is adjusted according to the brightness of the environment so that the brightness of the image to be captured is kept constant. The minimum speed of the shutter in capturing the recording image is set to 1/30 second within a range in which a camera shake does not become conspicuous.

In a range in which the shutter speed in capturing the recording image takes the minimum speed of 1/30 second and the brightness of the image to be captured cannot be optically adjusted, the image data are adjusted by the gain of the aforementioned AGC 10. Even in this range, the stop value F-number is set smaller than in capturing the recording image similar to the case of the stop interlock range, thereby increasing the aperture of the optical stop 7. For example, with regard to the capturing of a recording image based on the setting values (at point r2) where the shutter speed is 1/30 second and the gain of the AGC 10 is 6 dB, the shutter speed is set faster than 1/30 second (at point s2) in capturing the preview image.

According to the above setting, the camera shake that occurs more frequently as the shutter speed becomes low in capturing the preview image can be reduced, so that the confirmation of focus by the preview image outputted to the built-in monitor 20 can easily be achieved.

As described above, according to the present embodiment, by making the aperture of the optical stop 7 larger in capturing the preview image than in capturing the recording image, the depth of field is reduced to allow the confirmation of the focus of the built-in monitor 20 to be easily achieved. Furthermore, the cameras shake influences more on the image, as the shutter speed becomes slower. By setting the shutter speed in capturing the preview image faster than in capturing the recording image on the slow speed side of the shutter speed as described above, the influence of camera shake is reduced to allow the confirmation of the focus of the preview image outputted to the built-in monitor 20 to be easily achieved.

Figure 5:
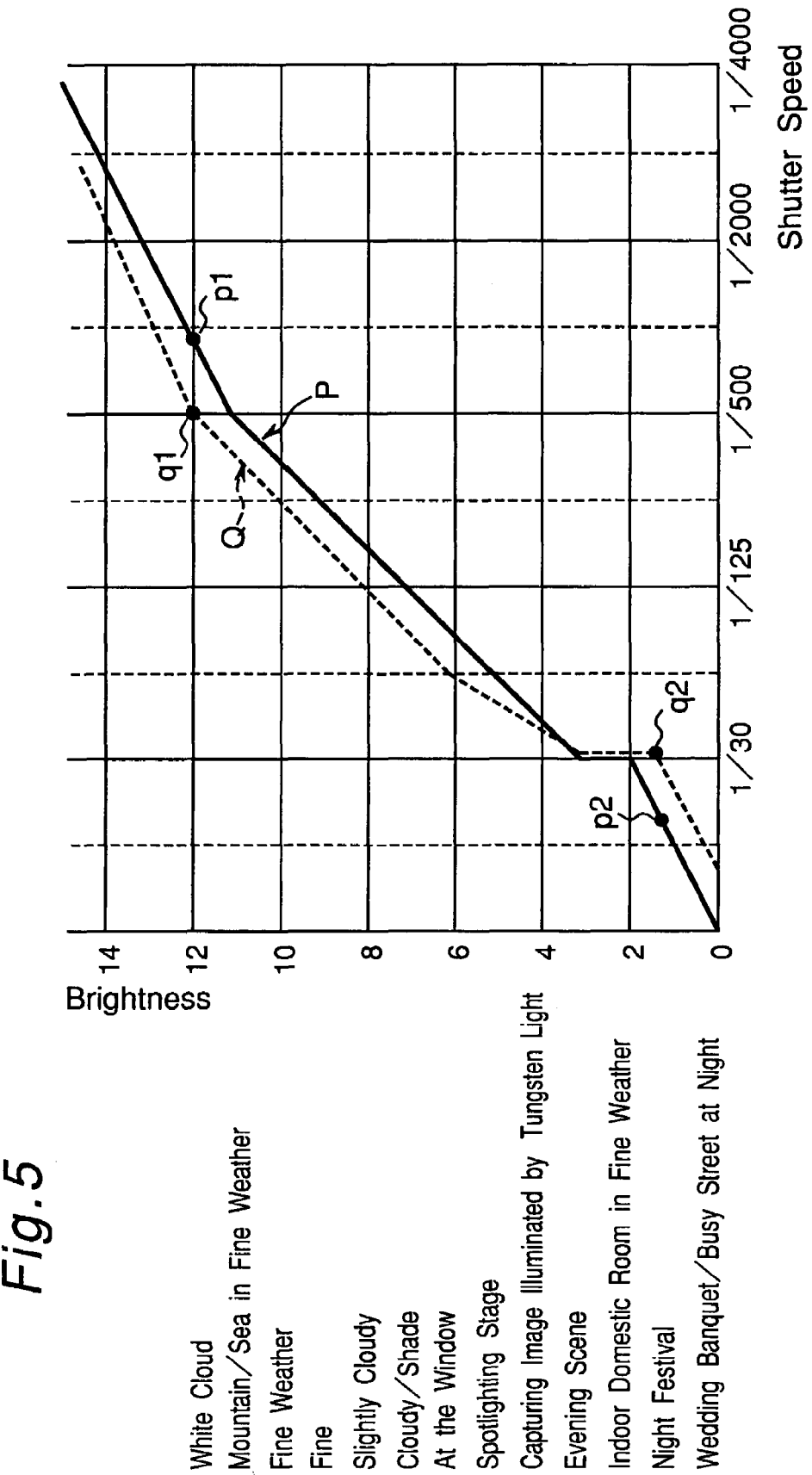
FIG. 5 is a graph showing the shutter speed relative to brightness.

The present electronic still camera 1 also has an exposure characteristic for more naturally reproducing the preview image. FIG. 5 shows a characteristic line representing the shutter speed-brightness relationship programmed for the camera control CPU 24 of the electronic still camera 1. In the figure, the solid line P and the dashed line Q indicate the exposure characteristics to be adopted in capturing the recording image and the preview image, respectively.

As is apparent from FIG. 5, according to this characteristic, the shutter speed is set faster in capturing the preview image than in capturing the recording image in a bright environment, so that the image is reproduced with increased brightness. On the other hand, the shutter speed is set slower in capturing the preview image than in capturing the recording image in a dark environment, so that the image is reproduced with reduced brightness.

For example, when a "white cloud" is chosen as a subject, by achieving overexposure in capturing the preview image by using a shutter speed (point q1) slower than the shutter speed (point p1) for capturing the recording image, the preview image is reproduced with increased brightness in the bright environment. When a "night festival" is chosen as a subject, the preview image is reproduced with reduced brightness in the dark environment by using in capturing the preview image a shutter speed (point q2) faster than a shutter speed (point p2) for capturing the recording image.

By thus correcting the apparent exposure influenced by the shooting environment in capturing the preview image thereby reproducing the image with increased brightness in a bright environment and with reduced brightness in the dark environment, a more natural preview image can be obtained.

In the exposure control process of the present embodiment, first, as stated before, the aperture of the optical stop 7 is set greater in capturing the preview image than in capturing the recording image so that the amount of exposure does not change based on the exposure characteristic shown in FIG. 4. Subsequently, by further setting the shutter speed in capturing the preview image slower than in capturing the recording image so that the overexposure is effected on the basis of the exposure characteristic shown in FIG. 5 in a state in which the aperture of the optical stop 7 is kept constant, a more natural image can be obtained when the preview image is outputted to the built-in monitor, and the focusing by the obtained preview image can easily be achieved.

Although the case where the preview image is outputted to the built-in monitor 20 is described in the present embodiment, the aforementioned exposure characteristic may be used even in capturing an image with the output destination set to the external monitor 21 in the CRT turning-on and -off mode in which the output destination of image data will be set to either the built-in monitor 20 or the external monitor 21.

Pixel Interpolating Process

A pixel interpolating process (steps S15 through S25 in FIG. 3) in the pixel interpolating section 13 will be described in detail next with reference to the subroutine of FIG. 6.

The electronic still camera 1 of the present embodiment is mounted with a CCD 8 of a Bayer array comprised of R (Red), G (Green) and B (Blue), by which image data of the Bayer array can be obtained. In the pixel interpolating section 13, pixels with unknown data of each color in the image data of the Bayer array are interpolated.

Figure 6:
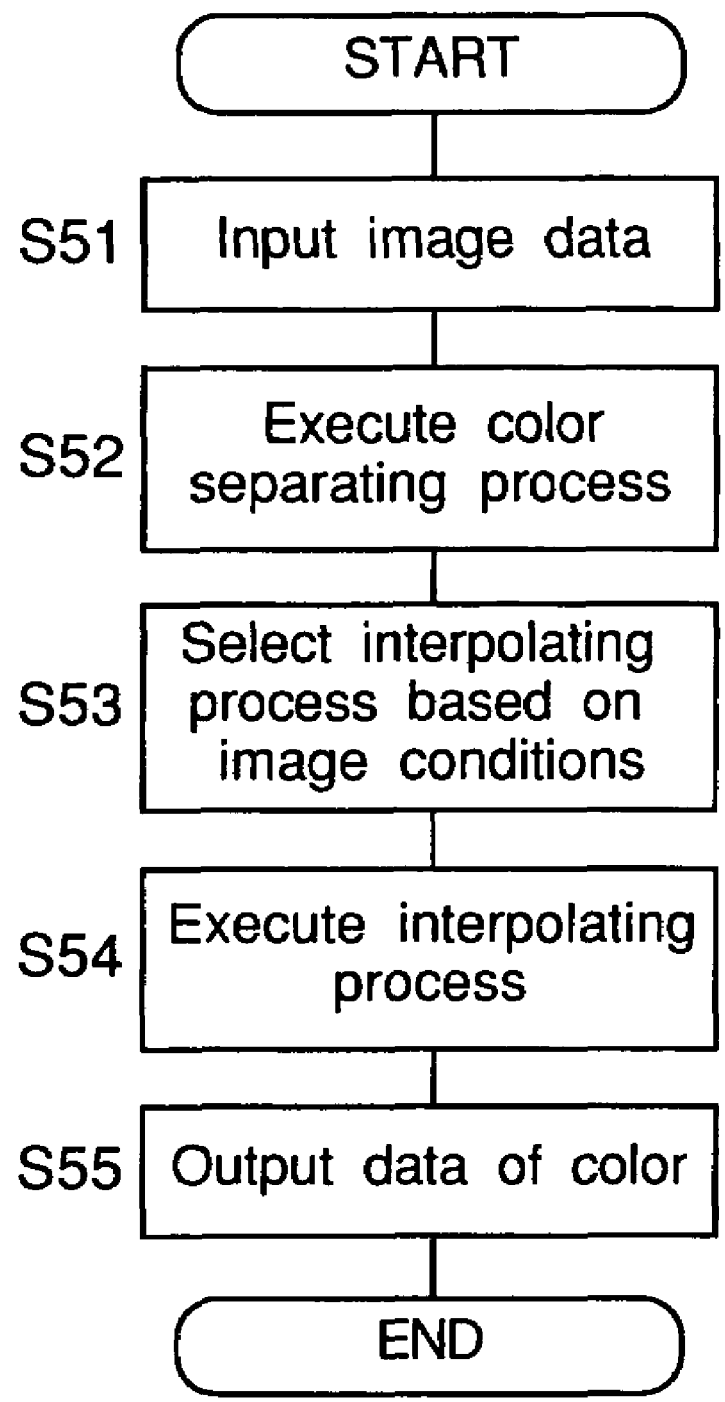
FIG. 6 is a subroutine of processing in a pixel interpolating section of the above electronic still camera.

As shown in FIG. 6, first in step S51, the image data of the Bayer array is inputted. The image data are color-separated into R, G and B color data in step S52. This pixel interpolating section 13 is provided with a plurality of interpolating means, and in step S53, one of the plurality of interpolating means is selected according to the image capturing conditions taken-in in step S10 of FIG. 3. Then, an interpolating process based on this selected interpolating means is executed (step S54). The image data obtained after the interpolating process are outputted to the band correcting section 14 (see FIG. 2) every color data in step S55.

The electronic still camera 1 of the present embodiment has three types of interpolating means in the pixel interpolating section 13, i.e., an interpolating means "a" using an average filter (so-called the average method), an interpolating means "b" using a median filter (so-called the median method), and an interpolating means "c" for executing simple interpolation by means of adjacent pixels. These interpolating means "a", "b" and "c" will be described below.

Figure 7:
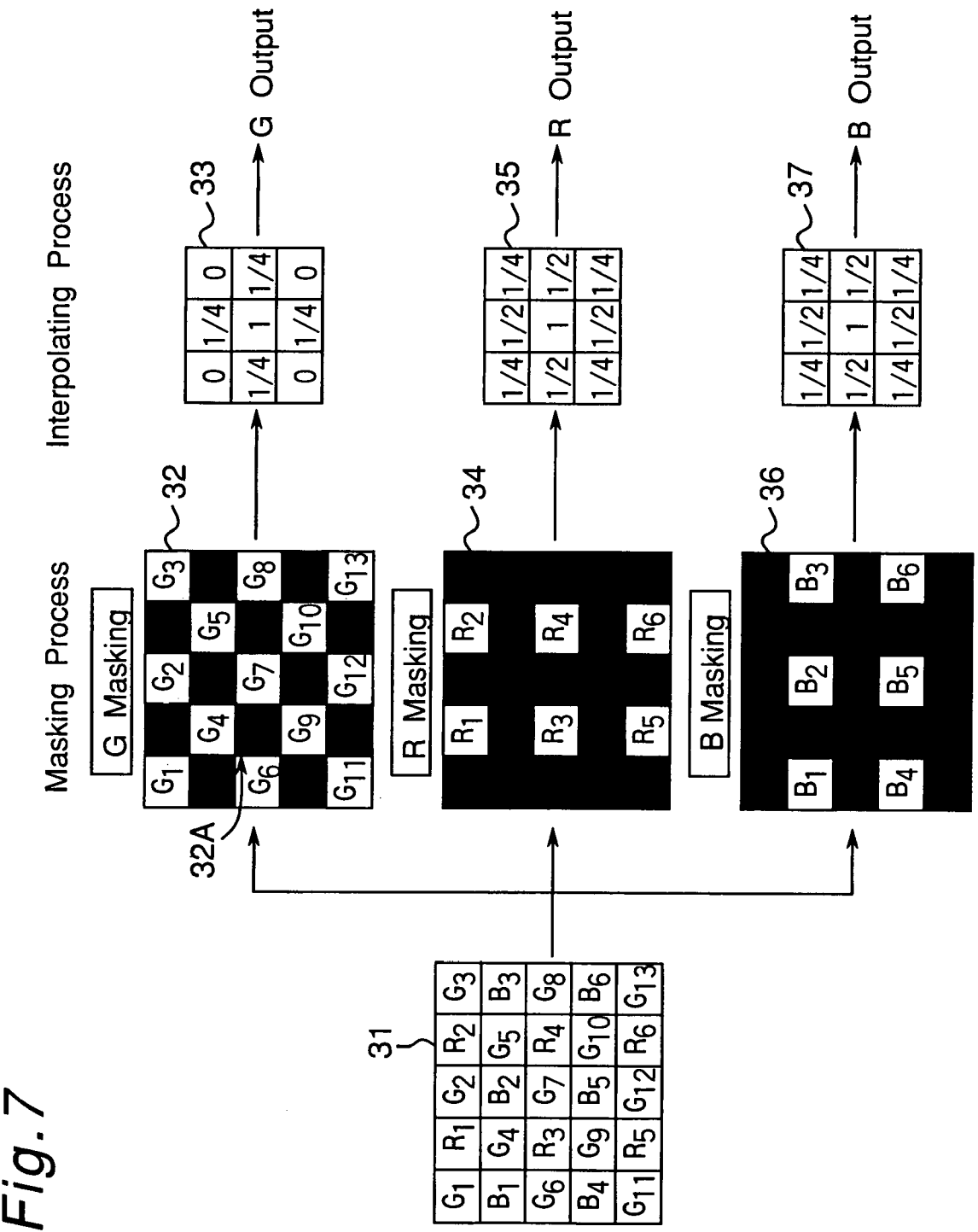
FIG. 7 is a view showing a flow of an interpolating means "a" in the above pixel interpolating section.

FIG. 7 is an explanatory view of the pixel interpolating means "a". The image data 31 of the CCD output pixel pattern (Bayer array) inputted to the pixel interpolating section 13 is subjected to a masking process according to different filter patterns every one of R, G and B pixels so as to be separated into color data 32, 34 and 36. These color data 32, 34 and 36 are masked with regard to the pixels having a color other than the objective color, i.e., the pixels with unknown data (the black-painted portion in the figure). By the pixel interpolating means "a", interpolating filters 33, 35 and 37 provided with a 3×3 filter matrix are applied to these color data 32, 34 and 36 having pixels with unknown data, so that the value of each pixel is replaced by an appropriate average of adjacent pixel values every color, thereby interpolating the pixels with unknown data.

For example, considering the case where a pixel 32A of G data is obtained by means of an interpolating filter 33, it can be obtained from the pixel values G4, G6, G7 and G9 located on the upper, lower, right-hand and left-hand sides according to the following equation. It is to be noted that the pixel 32A is calculated with its value set to zero.

$$G4 \times \tfrac{1}{4} + G6 \times \tfrac{1}{4} + G7 \times \tfrac{1}{4} + G9 \times \tfrac{1}{4} (G4+G6+G7+G9)/4 \quad (1)$$

By executing such an interpolating process on all the pixels with unknown data of G, all the pixel data of G can be obtained. With regard to the color data of R and B, by similarly executing the interpolating process by means of the filters 35 and 37, all the pixel data of R and B can be obtained. This pixel interpolating means "a" is called the average method, and its operating speed is relatively fast.

Figure 8:
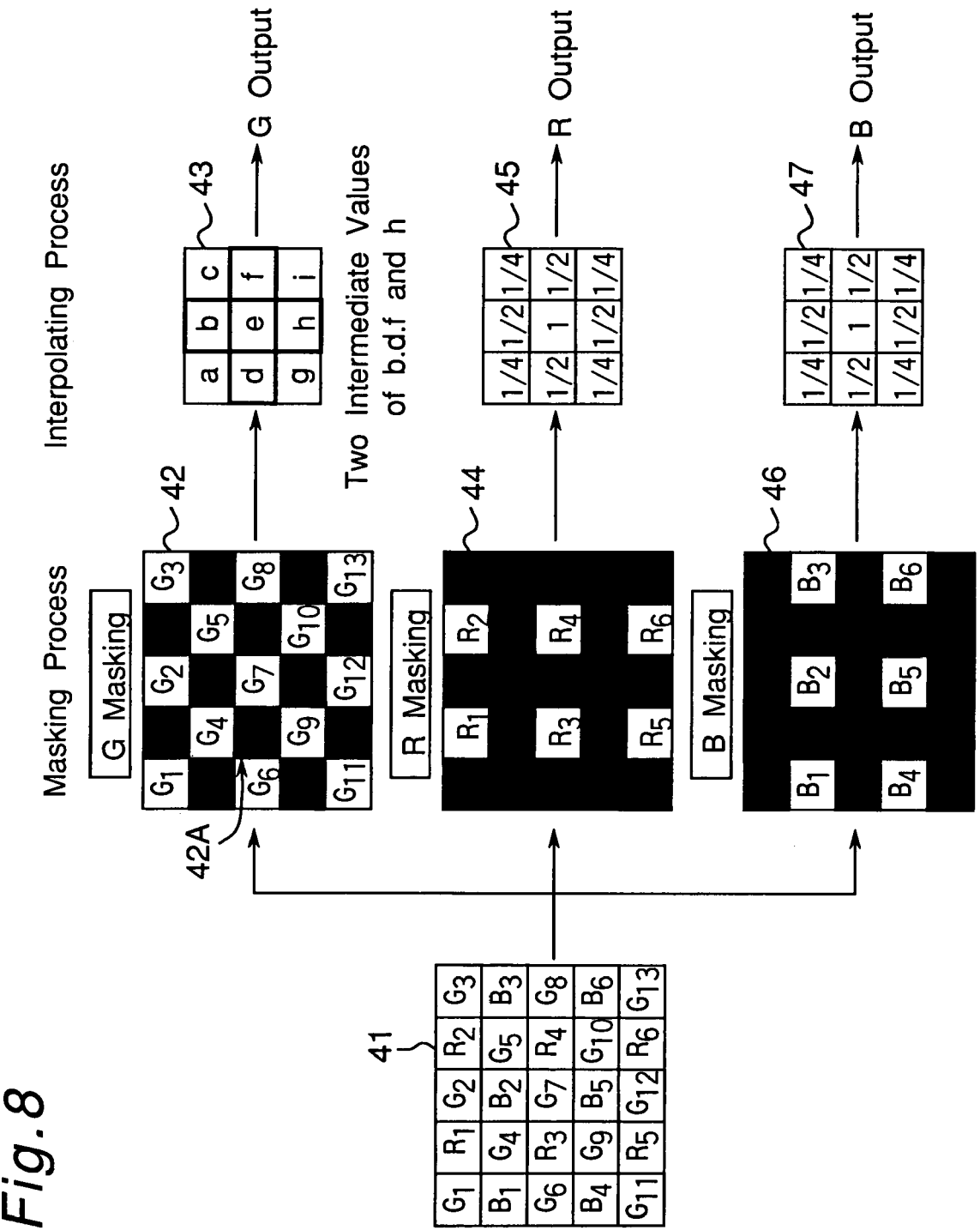
FIG. 8 is a view showing a flow of an interpolating means "b" in the above pixel interpolating section.

FIG. 8 is an explanatory view of the pixel interpolating means "b". The image data 41 of the CCD output pixel pattern (Bayer array), inputted to the pixel interpolating section 13, are subjected to a masking process according to different filter patterns for each one of R, G and B pixels similar to the interpolating means "a" so as to be separated into color data 42, 44 and 46. By the present interpolating means "b", the color data 42, 44 and 46 are processed as follows. To the color data of G having a pixel up to a high-frequency band is applied a median (intermediate value) filter 43, so that the value of the pixel with unknown data is replaced by an average value of two intermediate values of four pixels around the pixel. To the color data of R and B are applied the average filters 45 and 47 similar to the case of the aforementioned pixel interpolating means "a", so that the value of each pixel is replaced by an appropriate average of the adjacent pixels.

For example, when obtaining a pixel 42A of the G data by means of the median filter 43, first the pixel values G4, G6, G7 and G9 located on the upper, lower, right-hand and left-hand sides of the pixel 42A are compared in magnitude with one another. In this case, when G6<G4<G9<G7, the two intermediate values are G4 and G9, and the value of the pixel 42A is expressed by (G4+G9)/2. By executing this interpolating process on all the pixels with unknown data, all the color data of G are reproduced. This interpolating means "b" is called the median method, and its operating speed is slower than the aforementioned interpolating means "a".

Figure 9:
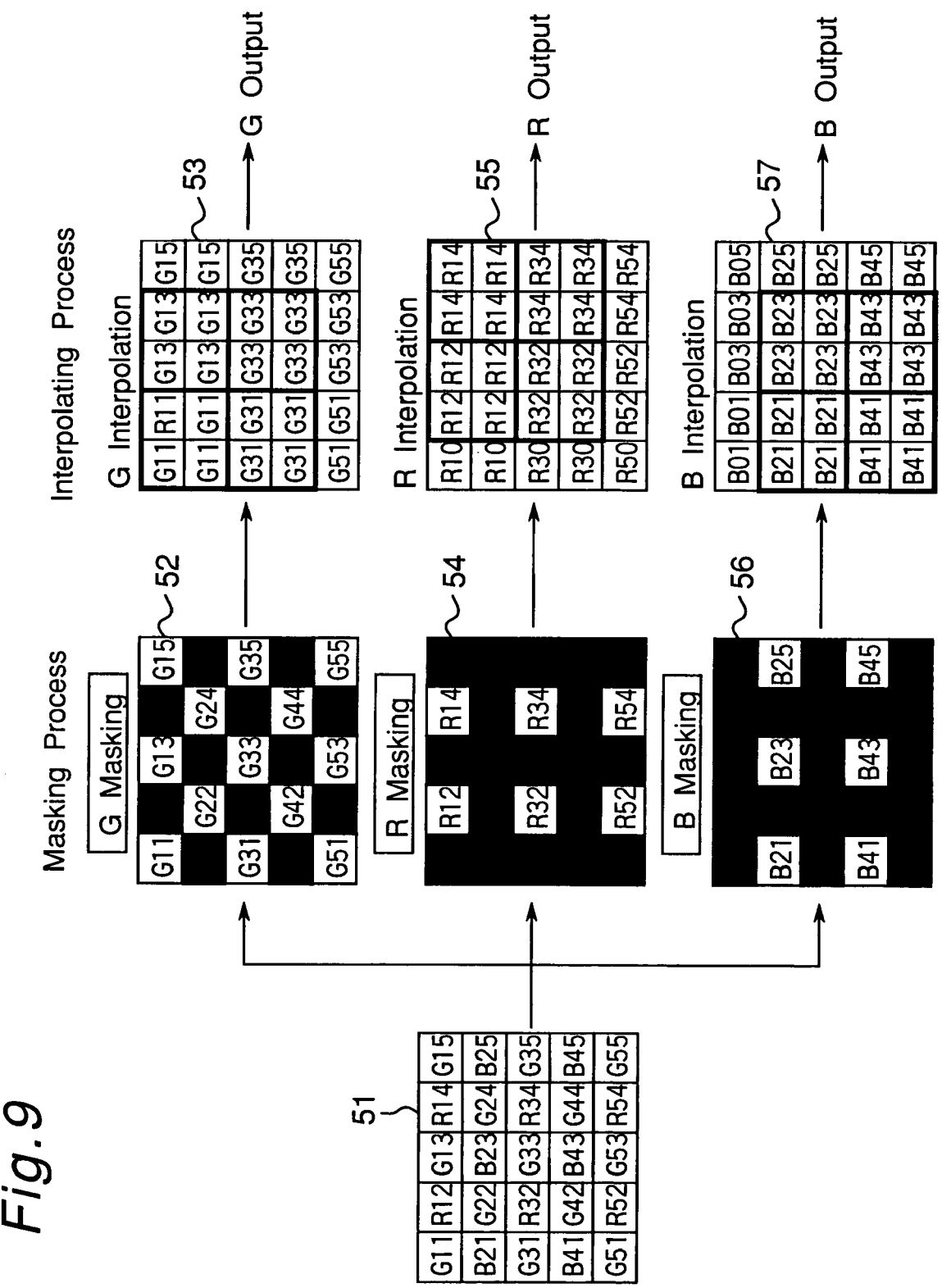
FIG. 9 is a view showing a flow of an interpolating means "c" in the above pixel interpolating section.

In the present embodiment, a pixel interpolating means "c" as shown in FIG. 9 is sometimes used in place of the pixel interpolating means "a" and "b" for obtaining the values of the pixels by means of an interpolation filter. This interpolating means "c" executes a simple interpolation for equalizing the pixel values every segment by color-separating image data 51 by filter patterns 52, 54 and 56, thereafter segmenting the same into 2×2 pixels as indicated by the thick lines of 53, 55 and 57, selecting one pixel existing in each segment and giving the pixel value to the other three pixels. This interpolating means "c" is inferior to the aforementioned interpolating means "a" and "b" in terms of the image quality, however, its processing speed is the fastest.

The pixel interpolating process is executed for each of the preview image and the recording image. In the present embodiment, an interpolating means of a faster processing speed is decisively used in the pixel interpolating section 13 when interpolating the preview image (step S18 of FIG. 3). In detail, according to the output destination of the preview image, the interpolating means "c" is used when the image data are outputted to the built-in monitor 20, and the pixel interpolating means "a" is used when the image data are outputted to the external monitor 21. According to this arrangement, the preview image data can be processed more rapidly throughout the entire process, and the user can immediately confirm the state of the image to be captured via the built-in monitor 20 or the external monitor 21.

On the other hand, during the interpolating process of the recording image (step S25 of FIG. 3), a specified interpolating means is selected from the aforementioned interpolating means of different processing speeds in the pixel interpolating section 13 according to various conditions (capture image size and image compression rate) set by the user before capturing an image. It is to be noted that the interpolating means "c" of the fastest processing speed has a greater influence on the image quality than the others and it is not used for the interpolating process of the recording image.

Table 1 shows relations between the capture image size and the image data compression rate set by the user and interpolating means selected according to them in the recording image data processing stage.

TABLE 1

| Capture image size | Image compression mode | RGB interpolation |
| --- | --- | --- |
| 512 × 384 | No compression | Interpolating means "b" |
|  | 1/8 JPEG compression | Interpolating means "a" |
|  | 1/20 JPEG compression | Interpolating means "a" |
| 640 × 480 | No compression | Interpolating means "b" |
|  | 1/8 JPEG compression | Interpolating means "b" |
|  | 1/20 JPEG compression | Interpolating means "a" |
| 1024 × 768 | No compression | Interpolating means "b" |
|  | 1/8 JPEG compression | Interpolating means "b" |
|  | 1/20 JPEG compression | Interpolating means "a" |

When the capture image size is set to "512×384" and the image compression mode is set to "⅛ JPEG compression", the pixel interpolating means "a" is used in the pixel interpolating section 13. According to the present embodiment, the pixel interpolating means "a" of the fast processing speed is selected in the pixel interpolating section 13 when the compression rate is set high in the image compressing section 17. This arrangement is intended for compensating for the loss of time in the pixel interpolating section 13 because more time is required for the compression process in the image compressing section 17 as the compression rate set by the user is higher.

Furthermore, in the present embodiment, when less importance is attached to the image quality for the purpose of saving the memory, and particularly when the capture image size is set to "512×384" and the image compression mode is set to "⅛ JPEG compression" or "1/20 JPEG compression", the pixel interpolating means "a" is selected in the pixel interpolating section 13. In this case, each process is executed relatively rapidly for handling an image of a small amount of data, and the loss of time in the image compressing section 17 is compensated in the pixel interpolating section 13. Therefore, the image data are processed more rapidly throughout the entire process.

As described above, by improving the image processing speed with regard, in particular, to the image capturing attaching less importance to the image quality, an increased number of image frames can be captured per unit time.

Although the case where one of the interpolating means "a", "b" and "c" is selected in the pixel interpolating section 13 in the present embodiment, it is acceptable to provide more interpolating means having different processing speeds and select the desired one among them. Even in this case, it is acceptable to select the interpolating means of the faster processing speed as the compression rate set by the user is higher, thereby allowing a processing speed conforming to the image quality to be achieved.

Band Control Process

As described above, when comparing the frequency characteristics of the data of colors immediately after executing the pixel interpolating process, it is found that the frequency characteristic of G reaches the higher frequency range than the other colors of R and B. This is attributed to the array of the RGB filter based on G (Bayer array in the present embodiment) in the CCD 8. In order to correct the reduction in resolution due to the pixels with unknown data of R, G and B, the band of the image data is controlled in the band correcting section 14.

The band control process (steps S16 and S26 of FIG. 3) in the band correcting section 14 will be described below.

Figure 10:
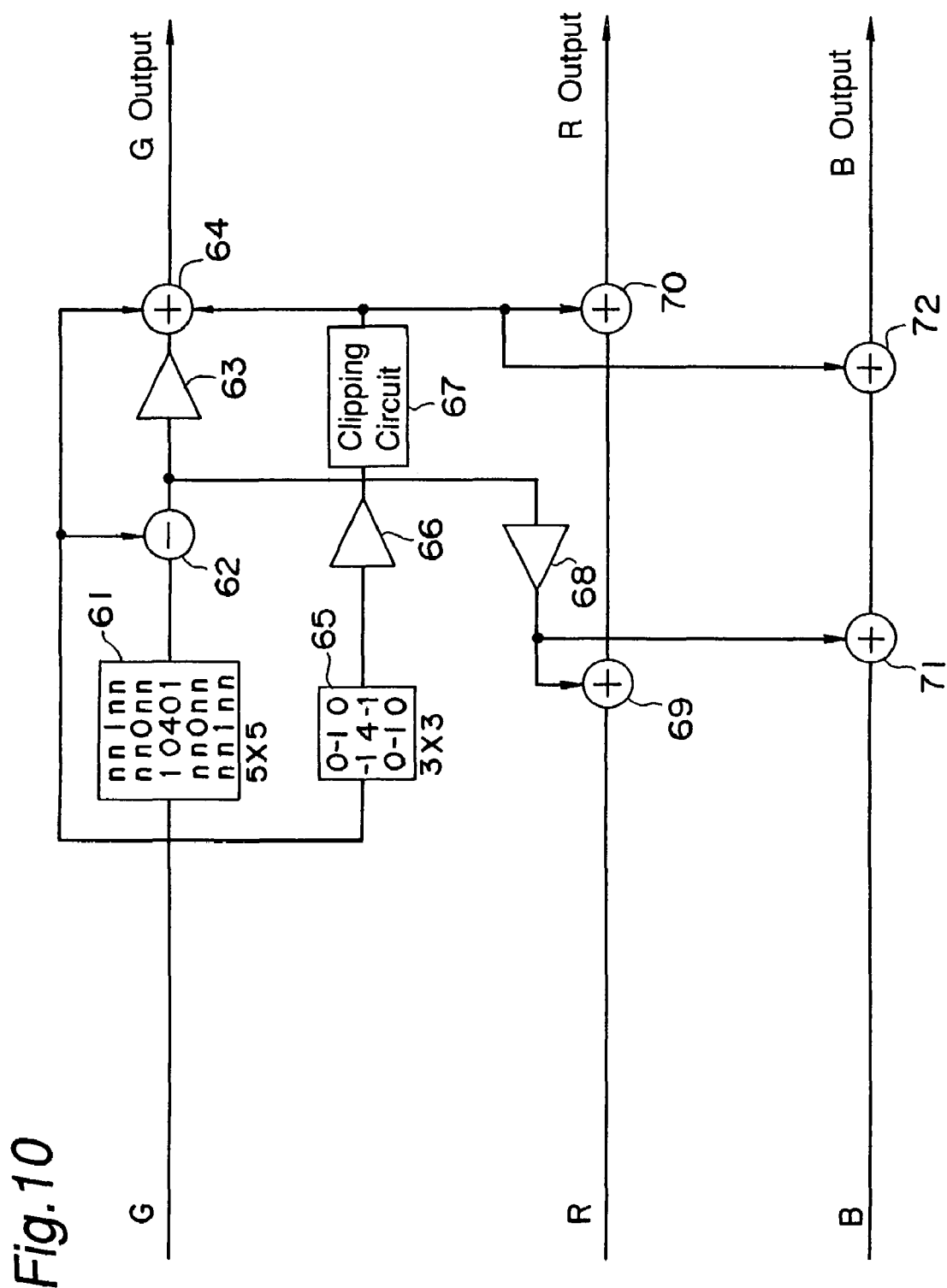
FIG. 10 is a diagram showing a flow of color data in a band correcting section of the above electronic still camera.

FIG. 10 shows a flow of the band control process of the data of each color. First, the G signal obtained after the pixel interpolating process is subjected to a band limitation identical to those of R and B by means of a GL-low-pass filter 61 provided with a 5×5 filter matrix, thereby extracting a signal (low-frequency signal) comprised of a low-frequency component. By subtracting this low-frequency signal from the original signal of G in a subtracting circuit 62, a signal comprised of an intermediate-frequency component (intermediate-frequency signal) is taken out. This intermediate-frequency signal is inputted to amplifiers 63 and 68.

The signal amplified with a specified gain in the amplifier 63 is added to the original signal of G in an adder circuit 64. On the other hand, the signal amplified in the amplifying section 68 is added to the signals of R and B comprised of the low frequency component in adder circuits 69 and 71.

Furthermore, in this band correcting process, a signal comprised of a high-frequency component (high-frequency signal) is extracted by applying a Laplacian filter 65 provided with a 3×3 filter matrix to the G signal obtained after the pixel interpolation. The extracted high-frequency signal is inputted to an amplifying section 66 and amplified with a specified gain. Thereafter, the base side of the waveform amplitude is removed by a clipping circuit 67, consequently obtaining the desired high-frequency signal. This high-frequency signal is added to the original signal of G in the adder circuit 64 or to the signals of R and B, respectively, in adder circuits 70 and 72.

As described above, the bands of the signals of R, G and B are controlled and outputted to the color balance control section 15.

The band correcting section 14 adjusts the levels of the R, G and B signals according to gain setting values ($\alpha$, $\beta$) in the amplifying section 66 for high-frequency correction and the amplifying sections 63 and 68 for intermediate-frequency correction, thereby controlling the frequency characteristic of each signal. For example, when the gain $\alpha$ of the amplifying section 66 is set to a great value, the high-frequency component of each signal is emphasized. When the gain $\beta$ of the amplifying sections 63 and 68 are set to great values, the intermediate-frequency component of each signal is emphasized.

Figure 11:
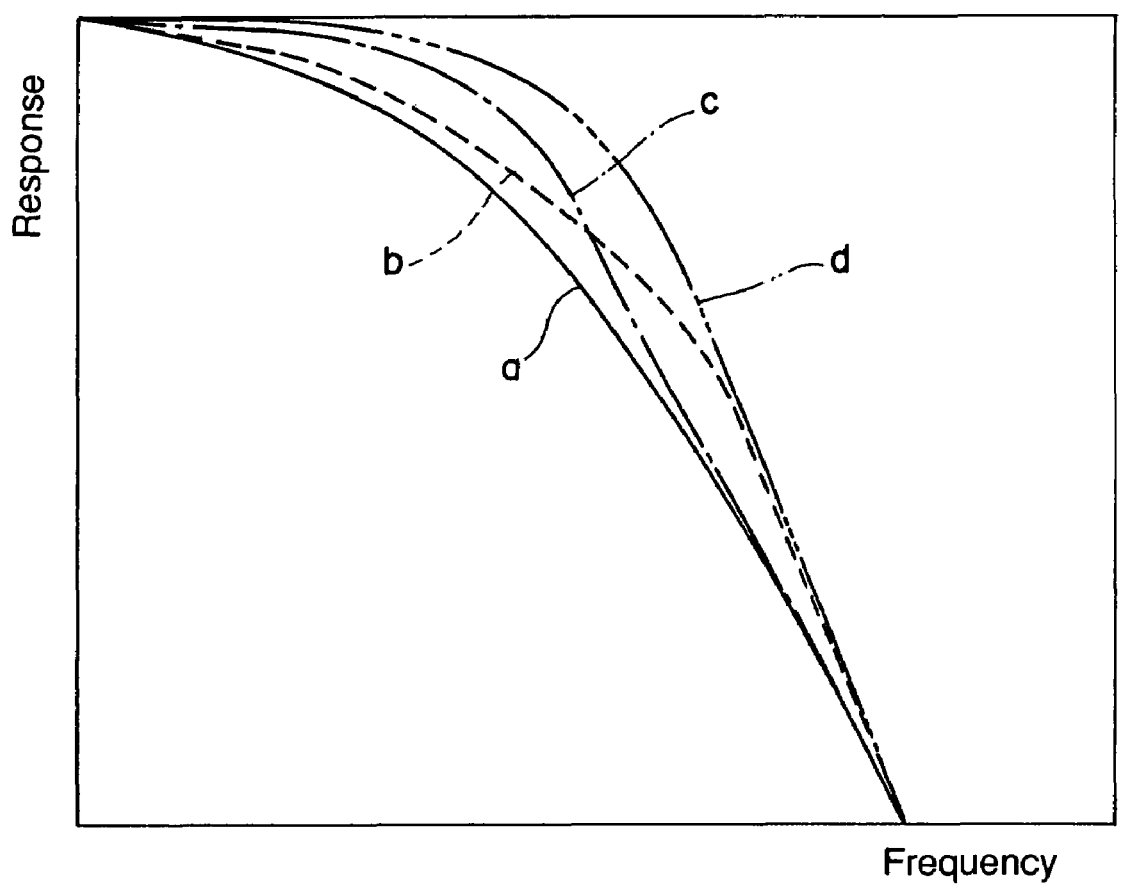
FIG. 11 is a graph showing a frequency characteristic after processing in the above band correcting section.

FIG. 11 shows the frequency characteristic curves of the output signal obtained for four combinations of gain setting values ($\alpha$, $\beta$). In this case, the horizontal axis represents the frequency, and the vertical axis represents the response.

The characteristic curve "a" (solid line) is in the case where the gain $\alpha$ in the amplifying section 66 for high-frequency correction is zero and the gain $\beta$ in the amplifying sections 63 and 68 for intermediate-frequency correction is zero.

The characteristic curve "b" (dashed line) is in the case where the gain $\alpha$ in the amplifying section 66 for high-frequency correction is 0.3 and the gain $\beta$ in the amplifying sections 63 and 68 for intermediate-frequency correction is zero. In this case, the high-frequency component of each signal is emphasized.

The characteristic curve "c" (one-dotted line) is in the case where the gain $\alpha$ in the amplifying section 66 for high-frequency correction is zero and the gain $\beta$ in the amplifying sections 63 and 68 for intermediate-frequency correction is 0.3. In this case, the intermediate-frequency component of each signal is emphasized. The characteristic curve "d" (two-dotted line) is in the case where the gain $\alpha$ in the amplifying section 66 for high-frequency correction is 0.3 and the gain $\beta$ in the amplifying sections 63 and 68 for intermediate-frequency correction is 0.3. In this case, the intermediate-frequency component and the high-frequency component of each signal are both emphasized.

As stated before, the electronic still camera 1 of the present embodiment is provided with an image recording mode capable of setting the type of the subject, and it includes the image recording modes of a "natural picture mode" to be used when the subject is a natural color graphic (natural picture), a "gray text mode" to be used for a monochrome graphic or a combination of it and letters and numbers, and a "binary text mode" to be used for only letters and numbers. In the present embodiment, the specified gain setting values ($\alpha$, $\beta$) are selected in the band correcting section 14 according to the image recording mode set by the user.

When the "natural picture mode" is set as the aforementioned image recording mode, the gain setting values ($\alpha$, $\beta$) are selected in the band correcting section 14 further in accordance with the capture image size and the image data compression rate set by the user.

Table 2 shows the relations between the capture image size and the image compression rate that the user sets and the high-frequency amplification gain $\alpha$ in the amplifying section 66 for high-frequency correction and the intermediate-frequency amplification gain $\beta$ in the amplifying sections 63 and 68 selected according to them when the "natural picture mode" is selected.

In the electronic still camera 1 of the present embodiment, specified gain setting values ($\alpha$, $\beta$) are selected on the basis of Table 2 according to the capture image size and the image data compression rate set by the user. For example, when the capture image size is set to "512×384 pixels" and the image compression mode is set to "⅛ JPEG compression", then the high-frequency amplification gain $\beta$ and the intermediate-frequency amplification gain $\beta$ take the values of 0.1 and 1.5, respectively, so that the intermediate-frequency component of each signal is emphasized.

TABLE 2

| Capture image size | Image compression mode | Intermediate-frequency amplification gain $\beta$ | High-frequency amplification gain $\alpha$ |
|---|---|---|---|
| 512 × 384 | No compression | 1.5 | 0.1 |
| | 1/8 JPEG compression | 1.5 | 0.1 |
| | 1/20 JPEG compression | 1.5 | 0 |
| 640 × 480 | No compression | 1.2 | 0.1 |
| | 1/8 JPEG compression | 1.2 | 0.1 |
| | 1/20 JPEG compression | 1.2 | 0 |

TABLE 2-continued

| Capture image size | Image compression mode | Intermediate-frequency amplification gain β | High-frequency amplification gain α |
|---|---|---|---|
| 1024 × 768 | No compression | 1 | 0.3 |
| | 1/8 JPEG compression | 1 | 0.3 |
| | 1/20 JPEG compression | 1 | 0 |

As is apparent from Table 2, the intermediate-frequency amplification gain β is set higher as the capture image size becomes smaller. Consequently, the intermediate-frequency component of each signal is emphasized, so that correction can be achieved with greater importance attached to the contrast while suppressing the noises in the high-frequency component that originally has no information. When the capture image size is large, then the high-frequency amplification gain α is set high, and high-frequency emphasis is executed so that reproducibility up to the high-frequency signal is assured.

Furthermore, the high-frequency amplification gain α is set lower as the image data compression rate is higher, and therefore, the high-frequency characteristic is reduced to suppress the generation of high-frequency noises.

As described above, the band control is executed based on the setting values of the specified amplification gain corresponding to the capture image size and the image data compression rate when the "natural picture mode" is set. By this operation, the reduction in high-frequency region of R and B due to the Bayer array based on G can be corrected, so that a frequency characteristic appropriate for the characteristics of the subject can be obtained while further suppressing the coloring of the edges and hue rotation.

The gain setting values (α, β) of each amplifying section in the band correcting section 14, when the image recording mode is set to the "gray text mode" or the "binary text mode", will be described next.

In the electronic still camera 1 of the present embodiment, when the "gray text mode" or the "binary text mode" is set as the image recording mode, the capture image size is automatically set to "1024×768 pixels". In this case, the gain setting values (α, β) are contrasted in each mode regardless of the image data compression rate. Table 3 shows the amplification gain setting values (α, β) to be used in setting each mode.

TABLE 3

| Image recording mode | Intermediate-frequency amplification gain β | High-frequency amplification gain α |
|---|---|---|
| Gray text mode (1024 × 768) | 1.5 | 0 |
| Binary text mode (1024 × 768) | 2 | 0 |

In the present embodiment, when the "gray text mode" is set as the image-recording mode, the intermediate-frequency component is emphasized and the high-frequency component is suppressed. With this arrangement, a high-contrast low-noise image which has a sharp outline and a color reproducibility kept intact is provided.

When the "binary text mode" is set, the intermediate-frequency component is raised to the maximum and the high-frequency component is suppressed. By thus emphasizing the outline and thereafter binarizing the image data with these settings, the reproduction of edges having reduced dot noises attributed to the Bayer array can be achieved.

Gradation Converting Process

A gradation converting process in the gamma correction section 16 will be described next. In this gamma correction section 16, the R, G and B signals normalized by the color balance control block 14 are subjected to gradation conversion by look-up tables of 1024-level and 256-level gray scales.

Gradation characteristics of gamma curves A through D as shown in FIG. 12 through FIG. 15 are set in the gamma correction section 16, and image data are subjected to gradation conversion based on one of these gamma curves A through D according to the situations.

Figure 12:
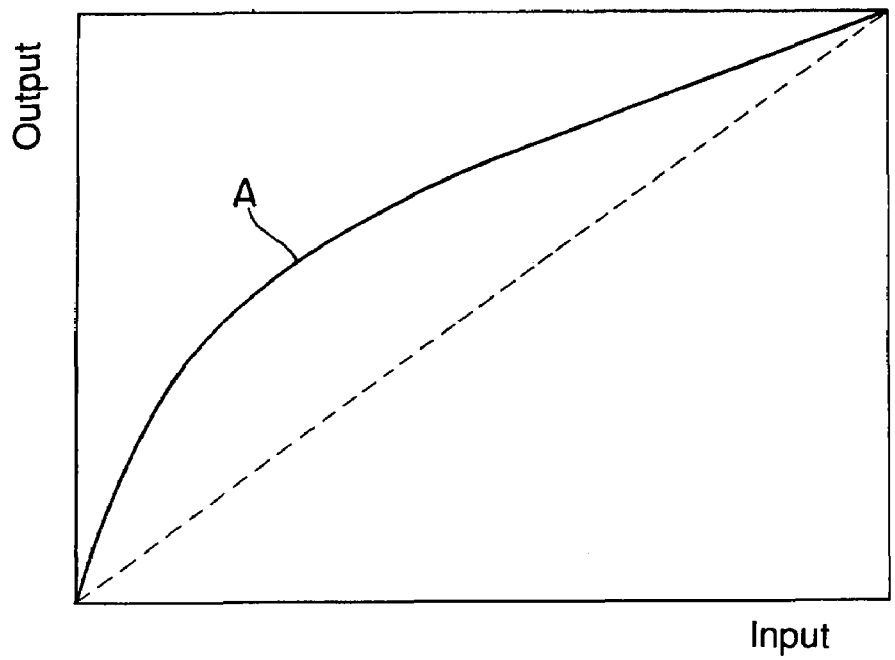
FIG. 12 is a graph of a gamma curve A representing a gradation characteristic for use in a gamma correcting section of the above electronic still camera.

FIG. 12 shows a gamma curve A representing the normal characteristic to be used for the case where the image output monitor is, for example, a personal computer CRT. In regard to the brightness of the surface of the output monitor, a roughly linear illumination gradation is obtained by correcting it by such a curve instead of making it proportional to the input voltage.

Figure 13:
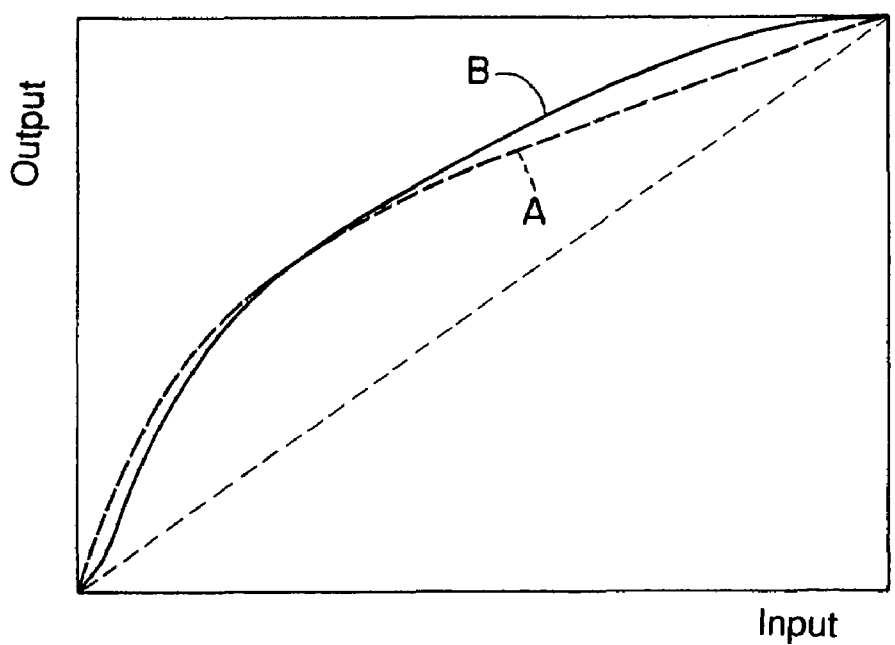
FIG. 13 is a graph of a gamma curve B representing a gradation characteristic for use in the above gamma correcting section.

FIG. 13 shows a gamma curve B representing a gradation characteristic to be used for the case where the output monitor is the personal computer CRT similar to the case of the gamma curve A. This gamma curve B draws a curve that appears above the gamma curve A on the higher input voltage side and appears below the gamma curve A on the lower input voltage side. According to the gradation characteristic represented by this gamma curve B, a high-contrast clear-cut image that is brighter on the bright side and darker on the dark side is obtained as compared with the case where the normal characteristic of the gamma curve A is used.

Figure 14:
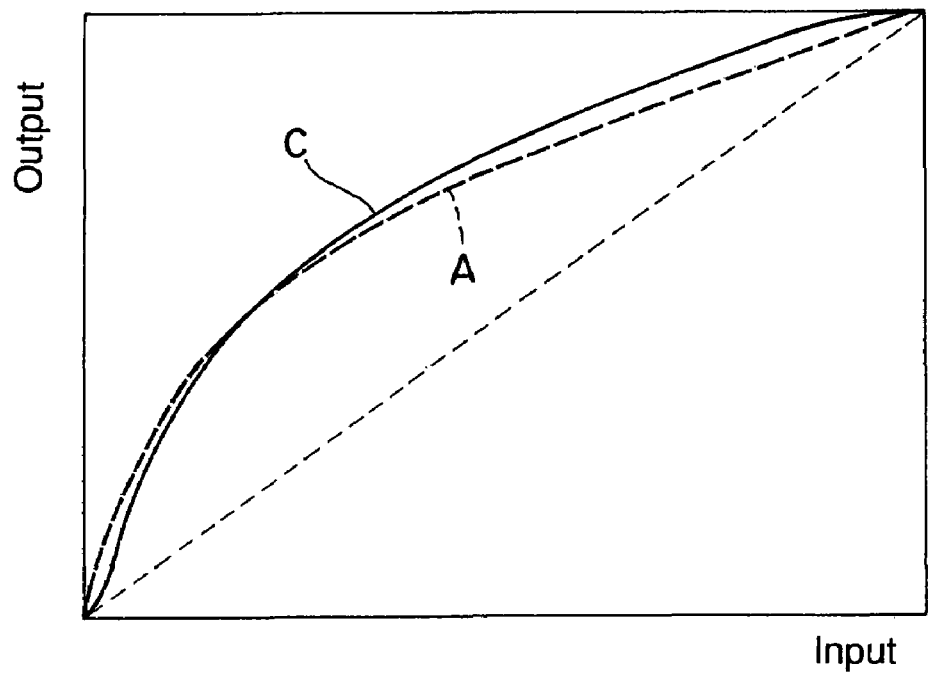
FIG. 14 is a graph of a gamma curve C representing a gradation characteristic for use in the above gamma correcting section.

Furthermore, the gamma curve C shown in FIG. 14 is used for the case where the output monitor is the built-in monitor 20. The gradation characteristic of this gamma curve C is to set the image to a higher contrast than the normal characteristic intended for the personal computer CRT. With this setting, image data appropriate for the output to, in particular, the LCD type built-in monitor 20 are obtained.

Figure 15:
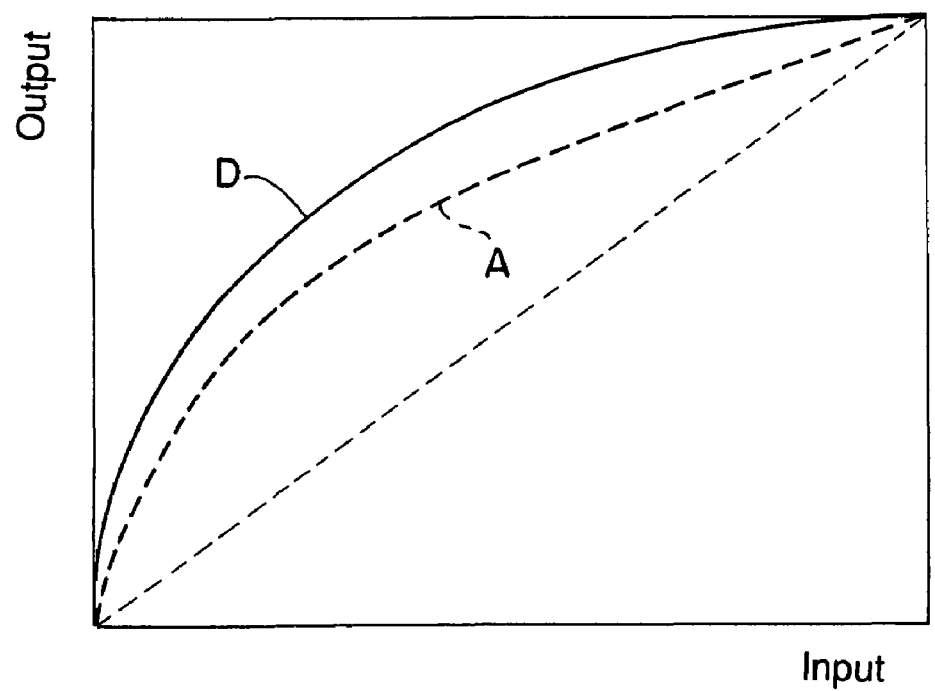
FIG. 15 is a graph of a gamma curve D representing a gradation characteristic for use in the above gamma correcting section.

Furthermore, the gamma curve D shown in FIG. 15 is used for the case where the output monitor is, for example, the external monitor 21 of a television receiver or the like. This gamma curve D draws a curve that appears above the gamma curve A as a whole. According to the gradation characteristic of this gamma curve D, a totally brighter image as compared with the normal characteristic of the gamma curve A can be obtained.

In the present embodiment, a specified gamma curve is selected from the aforementioned gamma curves A through D in the gradation converting process depending on whether the image data to be processed is the recording image data or the preview image data.

First, in the gradation converting process of the preview image data, either the gamma curve C or D is selected. In this case, the specified gamma curve is determined according to, in particular, the type of the output monitor. That is, the gamma curve C is selected when the output destination of the preview image data is the built-in monitor 20, and the image.data are subjected to gradation conversion based on the gradation characteristic of the gamma curve C. The gamma curve D is selected when the output destination is the external monitor 21, and the image data are subjected to gradation conversion based on the gradation characteristic of the gamma curve D.

As described above, the preview image data are converted into an image appropriate for the type of the output destination, and therefore, a preview image that is easy to view on the monitor can be obtained. With this arrangement, the state of the image to be recorded can be confirmed more accurately.

The gradation characteristic of the gamma curve C or D is used in the gradation converting process of the preview image, while either the gamma curve A or the gamma curve B is used in the gradation converting process of the recording image data.

In the gradation converting process of the recording image data, first, either the gamma curve A or the gamma curve B is selected according to the type of the image-recording mode set by the user. In the present embodiment, when the image-recording mode is set to the "gray text mode" or the "binary text mode", the gradation converting process is executed based on the gradation characteristic of the gamma curve B. With this arrangement, a high-contrast image can be reproduced in capturing a text image such as literal data.

When the image recording mode is set to the "natural picture mode", either the gamma curve A or B is further selected according to the capture image size and the type of the image data compression rate.

Table 4 shows the relations between the capture image size and the image data compression rate that the user sets and the gamma curves to be used for the gradation converting process according to them. For example, when the image size is set to "640×480" and the image compression mode is set to "1/20 JPEG compression", then the gamma curve B is selected, and the gradation converting process is executed on the basis of the gradation characteristic represented by this gamma curve B.

TABLE 4

| Image recording size | Image compression mode | Gamma curve |
| --- | --- | --- |
| 512 × 384 | No compression | Gamma curve B |
|  | 1/8 JPEG compression | Gamma curve B |
|  | 1/20 JPEG compression | Gamma curve B |
| 640 × 480 | No compression | Gamma curve A |
|  | 1/8 JPEG compression | Gamma curve B |
|  | 1/20 JPEG compression | Gamma curve B |
| 1024 × 768 | No compression | Gamma curve A |
|  | 1/8 JPEG compression | Gamma curve A |
|  | 1/20 JPEG compression | Gamma curve B |

As is apparent from Table 4, when the image data compression rate is set high, the processing is executed on the basis of the gradation characteristic of the gamma curve B. In this case, the image is made clear-cut and high contrast, so that the reduction in quality of the image obtained through a decompression process can be made less conspicuous.

Likewise, even when the capture image size is set small, the processing is executed on the basis of the gradation characteristic of the gamma curve B, so that the reduction in image quality on the monitor can be made least conspicuous.

As described above, in the gamma correction section 16, by selecting the specified gamma curve according to the various conditions and subjecting the image data to gradation conversion based on the gradation characteristic, the ease of viewing the outputted image can be enhanced.

Although one of the four types of gamma curves A through D is selected in the gamma correction section 16 according to the description of the present embodiment, it is acceptable to set more gamma curves of different gradation characteristics and select the desired one among them. Also in this case, by selecting the desired one among the plurality of curves depending on the situation, the image outputted on the monitor can be made easier to view.

The present invention is not limited to the aforementioned embodiments, and it is a matter of course that a variety of improvements or alterations in design can be achieved within the scope thereof.

What is claimed is:

1. An apparatus capable of image capturing comprising:
    an imaging device which captures image data;
    a recorder for recording image data transferred from said imaging device into a specified memory card;
    a display unit for displaying the image data transferred from said imaging device;
    an interpolating portion for executing interpolation of pixels constituting image data, the interpolating portion executing a first interpolation when displaying by the display unit, while executing a second interpolation different from the first interpolation when recording to the memory card by the recorder, both the first and second interpolation being processes for interpolating unknown pixels from the pixels of the image data; and
    a changer for changing an interpolating process by said interpolating portion depending on which one of recording by the recorder and displaying by the display unit is performed.

2. An apparatus capable of image capturing as claimed in claim 1, wherein said changer executes in a displaying stage an interpolating process of a faster processing speed than in a recording stage.

3. An apparatus capable of image capturing as claimed in claim 1, wherein a gamma correcting portion for correcting a gradation characteristic of an image is provided and said changer can change the gradation characteristic between recording and displaying.

4. An apparatus capable of image capturing as claimed in claim 3, wherein said gamma correcting portion sets a gradation characteristic according to the type of an image output destination.

5. An apparatus capable of image capturing as claimed in claim 4, wherein the image output destination is a built-in monitor unit or an external monitor unit.

6. An apparatus capable of image capturing as claimed in claim 1, wherein said interpolating portion executes an interpolating process based on data of each color of the image data.

7. An apparatus capable of image capturing as claimed in claim 1, wherein the image data generated by said imaging device is of a Bayer array.

8. An apparatus capable of image capturing comprising:
    an imaging device which captures image data;
    an image recording mode setting portion capable of setting an image recording mode;
    a band correcting portion for correcting a frequency characteristic of image data transferred from the imaging device;
    a gamma correcting portion for correcting a gradation characteristic of the image data transferred from the imaging device; and
    a controller for controlling the band correcting portion and the gamma correcting portion according to the set image recording mode.

9. An apparatus capable of image capturing as claimed in claim 8, wherein said band correcting portion has a plurality of frequency characteristics.

10. An apparatus capable of image capturing as claimed in claim 8, wherein said gamma correcting portion has a plurality of gradation characteristics.

11. An apparatus capable of image capturing as claimed in claim 8, wherein said image-recording mode setting portion sets a size of an image to be recorded.

12. An apparatus capable of image capturing as claimed in claim 11, wherein said controller controls the band correcting portion so as to emphasize an immediate-frequency component of frequency components included in the image as the image size set by the image recording mode setting portion decreases.

13. An apparatus capable of image capturing as claimed in claim 11, wherein said controller controls the gamma correcting portion so as to emphasize a contrast of the image as the image size set by the image recording mode setting portion decreases.

14. An apparatus capable of image capturing as claimed in claim 8, wherein said image-recording mode setting portion sets a compression rate in a recording stage.

15. An apparatus capable of image capturing as claimed in claim 14, wherein said controller controls the band correcting portion so as to suppress a high-frequency component of frequency components included in the image as the compression rate set by the image recording mode setting portion increases.

16. An apparatus capable of image capturing as claimed in claim 14, wherein said controller controls the gamma correcting portion so as to emphasize a contrast of the image as the compression rate set by the image recording mode setting portion increases.

17. An apparatus capable of image capturing as claimed in claim 8, wherein said image recording mode setting portion has a mode in which a halftone image is recorded as a mode to be set.

18. An apparatus capable of image capturing as claimed in claim 17, wherein said controller controls the band correcting portion so as to emphasize an immediate-frequency component of frequency components included in the image when the mode in which a halftone image is recorded is set in the image recording mode setting portion.

19. An apparatus capable of image capturing as claimed in claim 18, wherein said controller controls the band correcting portion so as to further suppress a high-frequency component of the frequency components included in the image.

20. An apparatus capable of image capturing as claimed in claim 17, wherein said controller controls the band correcting portion so as to suppress a high-frequency component of the frequency components included in the image when the mode in which a halftone image is recorded is set in the image recording mode setting portion.

21. An apparatus capable of image capturing as claimed in claim 17, wherein said controller controls the gamma correcting portion so as to emphasize a contrast of the image further than a specified reference gradation characteristic when the mode in which a halftone image is recorded is set in the image recording mode setting portion.

22. An apparatus capable of image capturing as claimed in claim 8, wherein said image recording mode setting portion has a mode in which a binary image is recorded as a mode to be set.

23. An apparatus capable of image capturing as claimed in claim 22, wherein said controller controls the band correcting portion so as to emphasize an intermediate-frequency component of frequency components included in the image when the mode in which a binary image is recorded is set in the image recording mode setting portion.

24. An apparatus capable of image capturing as claimed in claim 22, wherein said controller controls the gamma correcting portion so as to emphasize a contrast of the image further than a specified reference gradation characteristic when the mode in which a binary image is recorded is set in the image recording mode setting portion.

25. An apparatus capable of image capturing comprising:
an imaging device having a filter array of a plurality of colors;
a compression rate setting portion for setting a compression rate of image data;
an interpolating portion for executing pixel interpolation based on data of colors constituting said image data, said interpolating portion having a plurality of interpolators; and
a controller for selecting one of said plurality of interpolators according to a compression rate set by said compression rate setting portion.

26. An apparatus capable of image capturing as claimed in claim 25, wherein an image size setting portion for setting an image size is provided and said controller controls the interpolating portion according to the image size set by the image size setting portion.

27. An apparatus capable of image capturing as claimed in claim 25, wherein an interpolating process that is executed in said interpolating portion is selected out from among an interpolating process employing an average filter, an interpolating process employing a median filter and an interpolating process for executing simple interpolation with adjacent pixel data.

28. An apparatus capable of image capturing as claimed in claim 25, wherein an interpolating process of a higher processing speed is executed as the compression rate set by the compression rate setting portion is higher.

29. An image data processing method for an apparatus capable of image capturing, comprising the steps of:
setting a compression rate of image data obtained from an imaging device; and
executing an interpolating process, which is selected from a plurality of interpolating processes, on image data of colors constituting the image data according to the set compression rate.

30. An image data processing method as claimed in claim 29, wherein an interpolating process of a higher processing speed is executed in the apparatus capable of image capturing as the set compression rate becomes higher in interpolating process control.

31. An image data processing method for an apparatus capable of image capturing which can selectively display a captured image or record a captured image on a memory card, comprising the steps of:
capturing image data by means of an imaging device; and
executing a varied interpolating process depending on whether the captured image is to be displayed or recorded on the memory card, wherein a first interpolating process is executed when displaying, while a second interpolating process different from the first interpolating process is executed when recording, both the first and second interpolation being processes for interpolating unknown pixels from the pixels of the image data.

32. An image data processing method as claimed in claim 31, wherein an interpolating process of a faster processing speed is used in displaying the image than the interpolating process in recording the image during said interpolating process.

33. An image data processing method as claimed in claim 31, further comprising a gamma correcting step for correcting a gradation characteristic of an image.

34. An image data processing method as claimed in claim 31, wherein the image data generated by said imaging device is of a Bayer array.

* * * * *